(12) United States Patent
Faust

(10) Patent No.: US 9,634,319 B2
(45) Date of Patent: Apr. 25, 2017

(54) BIPOLAR BATTERY AND PLATE

(75) Inventor: Thomas Faust, Wyomissing, PA (US)

(73) Assignee: East Penn Manufacturing Co., Inc., Lyon Station, PA (US)

( * ) Notice: Subject to any disclaimer, the term of this patent is extended or adjusted under 35 U.S.C. 154(b) by 1578 days.

(21) Appl. No.: 13/229,251

(22) Filed: Sep. 9, 2011

(65) Prior Publication Data

US 2013/0065105 A1    Mar. 14, 2013

(51) Int. Cl.
| | | |
|---|---|---|
| *H01M 4/73* | (2006.01) | |
| *H01M 4/14* | (2006.01) | |
| *H01M 10/18* | (2006.01) | |
| *H01M 2/16* | (2006.01) | |
| *H01M 10/12* | (2006.01) | |

(52) U.S. Cl.
CPC ............. *H01M 4/14* (2013.01); *H01M 10/18* (2013.01); *H01M 2/1613* (2013.01); *H01M 10/127* (2013.01); *Y02E 60/126* (2013.01)

(58) Field of Classification Search
CPC ...................................................... H01M 4/73
See application file for complete search history.

(56) References Cited

U.S. PATENT DOCUMENTS

| | | |
|---|---|---|
| 715,413 A | 12/1902 | Paget |
| 3,723,181 A | 3/1973 | Oakley |
| 3,738,871 A | 6/1973 | Scholle |
| 3,819,412 A | 6/1974 | Taylor et al. |
| 4,098,967 A | 7/1978 | Biddick et al. |
| 4,225,654 A | 9/1980 | Tajima et al. |
| 4,275,130 A | 6/1981 | Rippel et al. |
| 4,542,082 A | 9/1985 | Rowlette |
| 4,900,643 A | 2/1990 | Eskra et al. |
| 5,334,464 A | 8/1994 | Rowlette |
| 5,510,211 A | 4/1996 | Sundberg et al. |
| 5,585,209 A | 12/1996 | Feldman |
| 5,618,641 A | 4/1997 | Arias |
| 5,729,891 A | 3/1998 | Richiardone et al. |
| 6,077,623 A | 6/2000 | Grosvenor et al. |

(Continued)

FOREIGN PATENT DOCUMENTS

| | | |
|---|---|---|
| DE | 4300763 A1 | 7/1994 |
| EP | 0726610 A1 | 8/1996 |

(Continued)

OTHER PUBLICATIONS

Machine translation of JP 2001-185130 A. Printed Feb. 8, 2016.*

(Continued)

*Primary Examiner* — Maria J Laios
(74) *Attorney, Agent, or Firm* — Barley Snyder

(57) ABSTRACT

A bipolar battery plate is utilized for production of a bipolar battery. The bipolar battery plate includes a frame, a substrate, first and second lead layers, and positive and negative active materials. The substrate includes a plurality of perforations through the substrate, and the substrate is positioned within the frame. The first lead layer is positioned on one side of the substrate, while the second lead layer is positioned on another side of the substrate. The first and second lead layers are electrically connected to each through the plurality of perforations. The positive active material is positioned on a surface of the first lead layer, while the negative active material is positioned on a surface of the second lead layer.

21 Claims, 5 Drawing Sheets

(56) References Cited

U.S. PATENT DOCUMENTS

| | | |
|---|---|---|
| 6,139,705 A * | 10/2000 | Brown, Jr. ............... C25C 7/02 204/284 |
| 6,511,766 B1 | 1/2003 | Loutfy et al. |
| 6,576,365 B1 | 6/2003 | Meitav et al. |
| 7,201,986 B2 | 4/2007 | McLean |
| 7,419,720 B2 | 9/2008 | Hofmann et al. |
| 2001/0006745 A1 | 7/2001 | Bronoel et al. |
| 2002/0160264 A1 | 10/2002 | Bronoel et al. |
| 2003/0219646 A1 | 11/2003 | LeCostaouec |
| 2009/0053601 A1 | 2/2009 | Kelley |
| 2009/0081541 A1 | 3/2009 | Kelley |
| 2010/0183920 A1 | 7/2010 | Shaffer, II et al. |
| 2012/0237816 A1 | 9/2012 | Roscheisen et al. |

FOREIGN PATENT DOCUMENTS

| | | | |
|---|---|---|---|
| JP | 48-519 U * | 1/1973 | |
| JP | 48-519 U | 1/1973 | |
| JP | 59121787 A | 7/1984 | |
| JP | 2001-185130 * | 7/2001 | ............. H01M 4/14 |
| JP | 2001185130 A | 7/2001 | |
| WO | 9429923 | 12/1994 | |

OTHER PUBLICATIONS

PCT Notification and International Preliminary Report on Patentability and Written Opinion, Application No. PCT/US2012/053869, dated Mar. 20, 2014, 7 pages.

1st Office Action issued in Chinese co-pending application 201280043585.4, dated Aug. 4, 2015, 3 pages.

Advanced Battery Concepts Newsletter, Green Seal, Our Batteries, About Us Management Team, Home, 5 pages.

Advanced Battery Concepts, LLC Generation 1 Prototype Results, Ed Shaffer and Bill Brecht, Published data from Atraverda, Proceedings of the 23rd IPSS Meeting, Amsterdam, Sep. 2003, GreenSeal Bipolar Assemblies, Gen 1 Prototype, Discharge Curve, GreenSeal U1 Wheelchair Battery, 5 pages, Jan. 19, 2008.

PCT International Search Report, dated Dec. 13, 2012, 5 pages.

PCT Written Opinion of the International Searching Authority, 5 pages, dated Dec. 13, 2012.

European Patent Office Communication, dated Jan. 27, 2017, 6 pages.

* cited by examiner

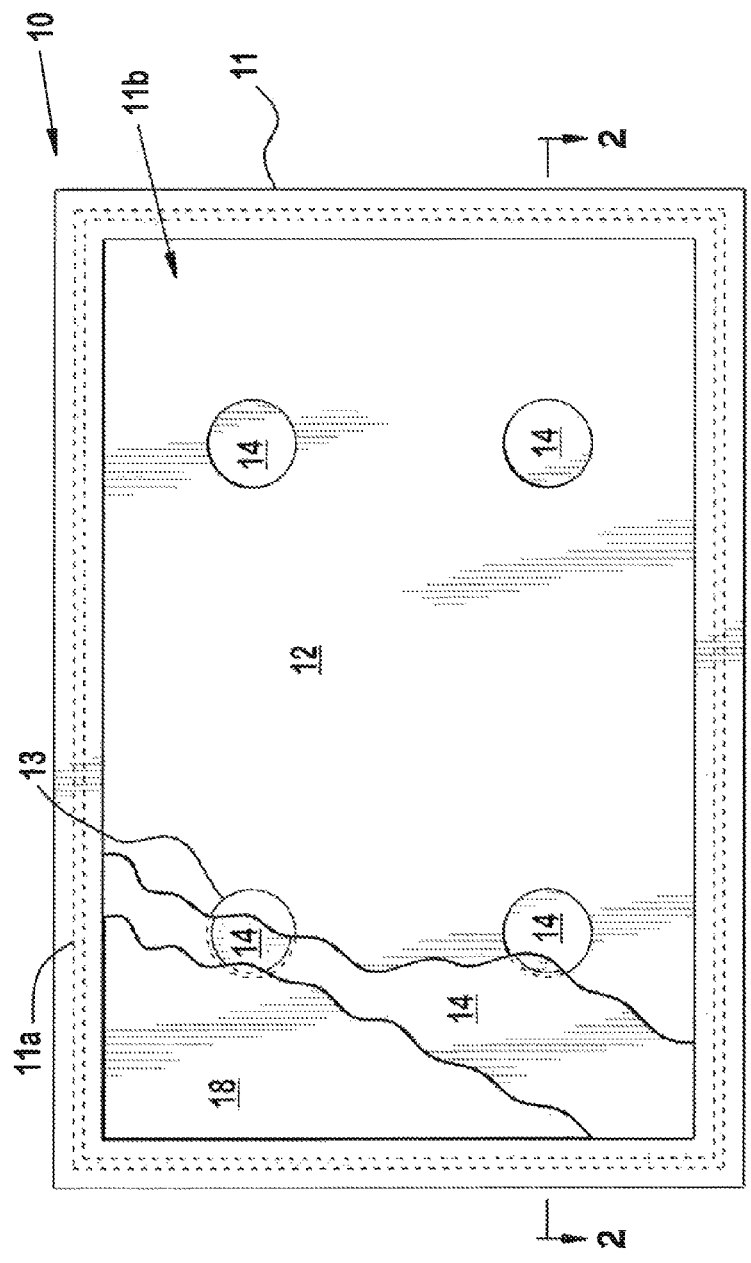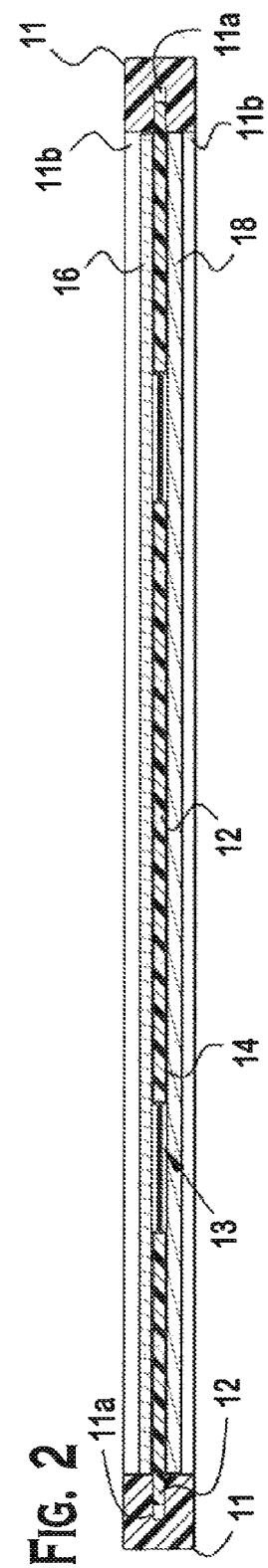

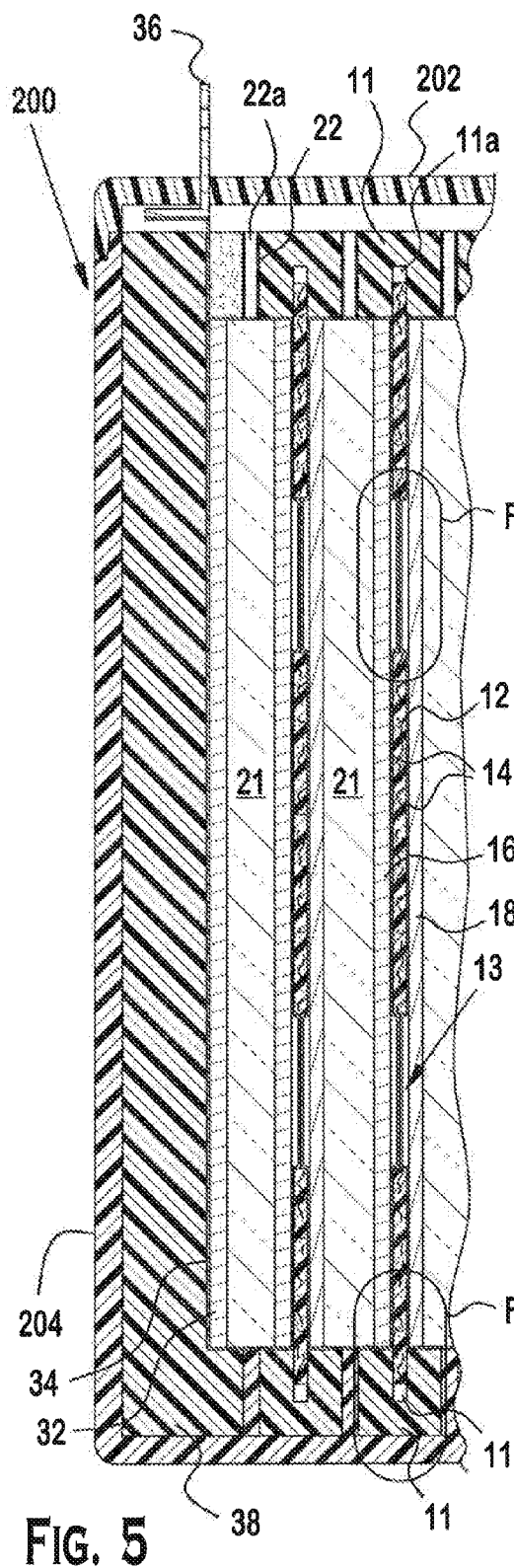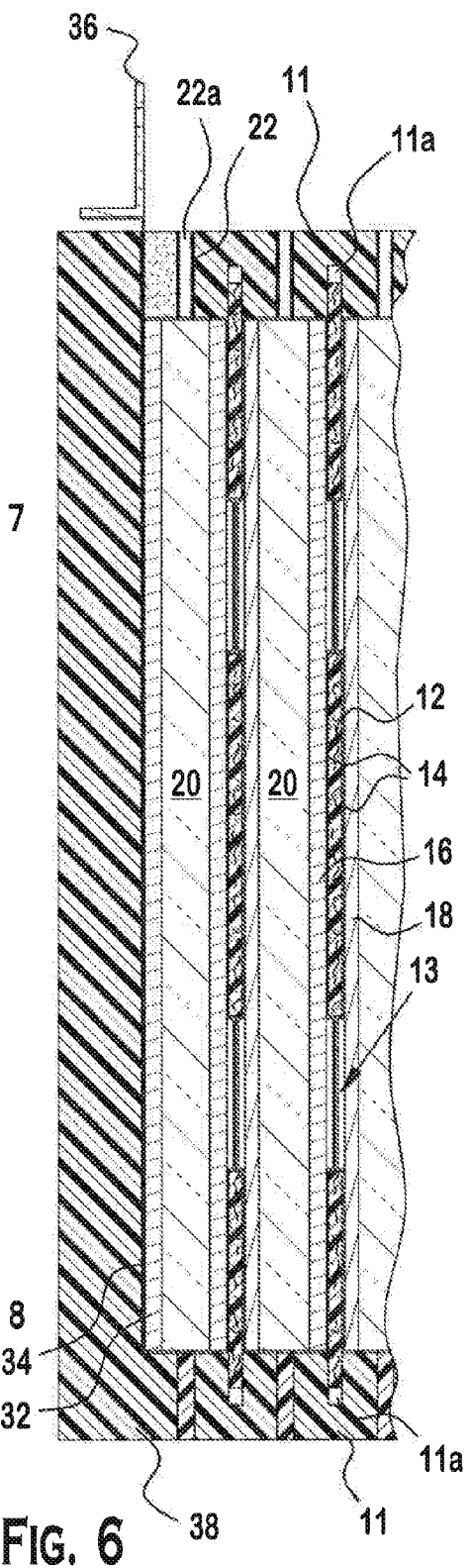

BIPOLAR BATTERY AND PLATE

FIELD OF THE INVENTION

The invention relates to a battery and in particular to a bipolar battery having a series of bipolar battery plates.

BACKGROUND

A conventional bipolar battery generally includes electrodes having a metallic conductive substrate on which positive active material forms one surface and negative active material forms the opposite surface. The active materials are retained by various means on the metal conductive substrate which is nonconductive to electrolyte ions. The electrodes are arranged in parallel stacked relation to provide a multi-cell battery with electrolyte and separator plates that provide an interface between adjacent electrodes. Conventional mono-polar electrodes, used at the ends of the stack are electrically connected with the output terminals. Most bipolar batteries developed to date have used metallic substrates. Specifically, bipolar lead-acid systems have utilized lead and alloys of lead for this purpose. The use of lead alloys, such as antimony, gives strength to the substrate but causes increased corrosion and gassing.

In most known plates for bipolar batteries, the positive active material, usually in the form of a paste is applied to the metallic conductive substrate on one side while the negative active material is similarly applied to the opposite side. The plates may be contained by a frame which seals the electrolyte between plates so that it cannot migrate through the plate.

In U.S. Pat. No. 4,275,130, a bipolar battery construction 20 is disclosed having a plurality of conductive biplates 21. Each bipolar plate 21 may include a composite, substrate sheet 34 including a continuous phase resin material, which is nonconductive to electrolyte ions. The composite substrate sheet 34 also includes uniformly distributed, randomly dispersed conductive fibers 33 embedded in the material. The binder resin is a synthetic organic resin and may be thermosetting or thermoplastic. The composite substrate sheet 34 has substantially flat opposite side faces 35 which include at their surfaces exposure of portions of the embedded graphite fibers 33. The embedded graphite fibers not only provide electrical conductivity through the substrate sheet 34, but also impart to the thermoplastic material a high degree of stiffness, rigidity, strength and stability. Substrate sheet 34 may be made in any suitable manner such as by thoroughly intermixing the thermoplastic material in particle form with the graphite fibers. The mixture is heated in a mold and then pressure formed into a substrate sheet of selected size and thickness. After the sheet has been cured, the substantially flat side faces 35 may be readily treated or processed, as for example by buffing, to eliminate pinholes or other irregularities in the side faces.

As disclosed, lead stripes are bonded to the composite substrate sheet 34 by known plating processes. On the positive side face 35, the facial areas between lead stripes 38 are covered by a coating of corrosion resistant resin 36 suitably a fluorocarbon resin such as Teflon (polytetrafluoroethylene) which protects against anodic corrosion of the adjacent graphite fibers and polyethylene of the substrate 34. On the negative side face 35, facial areas between lead stripes 37 may be protected by a thin coating of resin impermeable to electrolyte such as a polyethylene coating 36a. In fabrication of the bipolar plate 21 and after the composite substrate sheet 34 has been formed, a thin Teflon sheet may be bonded to the positive side surface 35. Prior to bonding, window like openings corresponding in length and width to the lead stripes are cut. Plating thereafter will bond the lead in stripes 38 to the exposed conductive graphite surfaces on the substrate side face 35. The same fabrication process may be utilized on the negative side face 35 to coat the nonstriped areas with polyethylene or other like material. Plating of the negative stripes may be achieved as with the positive stripes.

A separator plate 23 serves to support the positive active material 24 and the negative active material 25 and may be made of a suitable synthetic organic resin, preferably a thermoplastic material such as microporous polyethylene.

Battery construction 20 includes a plurality of conductive bipolar plates 21, peripheral borders or margins thereof being supported and carried in peripheral insulating casing members 22. Interleaved and arranged between bipolar plates 21 are a plurality of separator plates 23 The separator plates carry positive active material 24 on one side thereof and negative active material 25 on the opposite side thereof. The casing members 22, together with the bipolar plates 21 and separator plates 23, provide chambers 26 for containing electrolyte liquid. At each end of battery construction 20, standard bipolar plates 21 interface with current collecting plates, where 27 is the negative collector plate and 28 is the positive collector plate. Externally of end collectors 27 and 28 are provided pressure members 30 interconnected by rods 31 having threaded portions for drawing the pressure members plates together and applying axial compression to the stacked arrangement of bipolar plates and separator plates.

The bipolar plate 21 is lightweight, rigid, but includes joint lines between the lead stripe edges and protective coatings to resist corrosion and structural deterioration of the substrate. Furthermore, a plating process is required in order to bond the lead stripes 37, 38 to the conductive substrate having graphite fibers. Conductivity is limited by the size and amount type of graphite fibers in the substrate. Additionally, a plurality of bipolar plates 21 and layers are required to sit in separate casing members 22 and an external frame, all of which require further processing steps for more parts. The bipolar battery construction 20 is a complicated design having many layers of materials and substrates assembled in multiple chambers 26 and bodies 43 that are secured together by a complex external frame.

SUMMARY

It is an object of the present invention, among other objects, to provide a bipolar battery having a simplified bipolar plate design, wherein the active materials are encased within an insulated frame having a moldable substrate with perforations to improve conductivity between the active materials. Furthermore, the bipolar battery is inexpensive to produce and does not require a complex external frame to support the bipolar plates.

Each bipolar battery plate includes a frame, a substrate, first and second lead layers, and positive and negative active materials. The substrate includes a plurality of perforations through the substrate, and the substrate is positioned within the frame. The first lead layer is positioned on one side of the substrate, while the second lead layer is positioned on another side of the substrate. The first and second lead layers are electrically connected to each through the plurality of perforations. The positive active material is positioned on a surface of the first lead layer, while the negative active material is positioned on a surface of the second lead layer.

BRIEF DESCRIPTION OF THE DRAWINGS

The invention is explained in more detail below with reference to the Figures shown in the drawings, which illustrate exemplary embodiments of the present invention wherein:

FIG. 1 is a front view of a bipolar plate according to the invention;

FIG. 2 is a sectional view of the bipolar plate taken along the line 2-2 of FIG. 1;

FIG. 5 is a partial sectional view of the bipolar battery according to the invention having a casing;

FIG. 6 is another partial sectional view of the bipolar battery according to the invention without the casing;

DETAILED DESCRIPTION OF THE EMBODIMENT(S)

Figure 3:
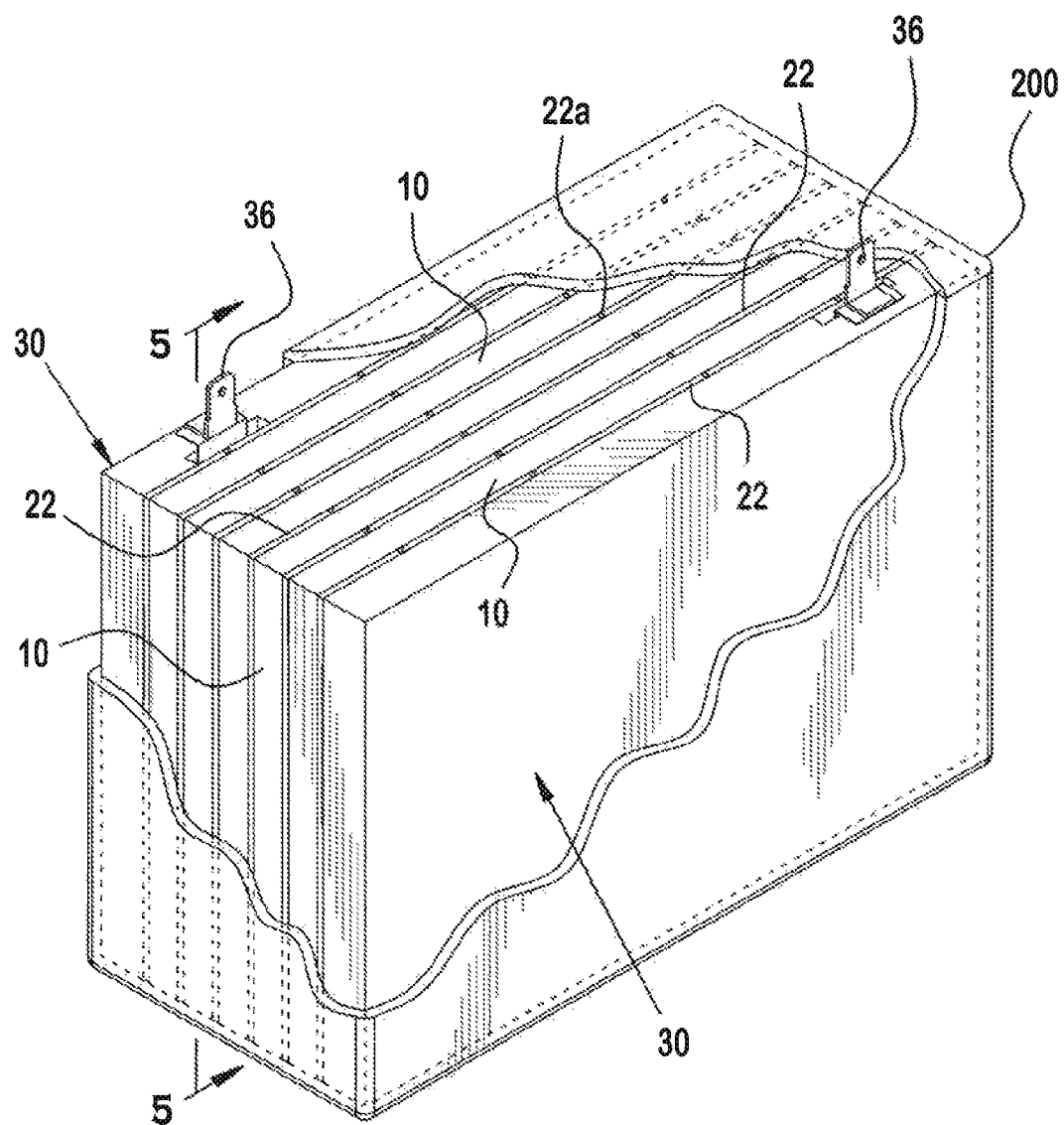
FIG. 3 is a perspective view of a bipolar battery according to the invention.

The invention is explained in greater detail below with reference to the drawings, wherein like reference numerals refer to the like elements. The invention may, however, be embodied in many different forms and should not be construed as being limited to the embodiments set forth herein; rather, these embodiments are provided so that the description will be thorough and complete, and will fully convey the concept of the invention to those skilled in the art.

With respect to FIGS. 1-9, a bipolar battery 100 according to the invention includes a plurality of bipolar plates 10, spacers 22 holding an electrolyte 20, and terminal end sections 30. Each of these components are stacked together to complete a bipolar battery 100 according to the invention, which is an adaptable design with minimal number of parts devoid a complex exterior support structure.

Now with reference to FIGS. 1 and 2, a bipolar plate 10 according to the invention is discussed. The bipolar plate 10 includes a frame 11, a substrate 12, a plurality of perforations 13 along and extending through a front and rear surface of the substrate 12, lead foils 14, a first active material 16, and a second active material 18.

In general, the substrate 12, lead foils 14, first active material, 16 and second active material are encased within the frame 11, which provides support and protection for the bipolar plate 10. The substrate 12 is positioned in a center of the frame 11, the lead foils 14 are positioned on both sides of the substrate, and the active materials 16, 18 are then positioned over the lead foils 14. The frame 11 is non-conductive. In the embodiment shown, the frame 11 is a moldable insulative polymer, such as polypropylene, acrylonitrile butadiene styrene (ABS), polycarbonate, copolymers, or polymer blends. Because the frame 11 is moldable, the number of shape and size configurations are abundant, which provides a bipolar plate 10 according to the invention that can be tailored to different uses.

In the embodiment shown, the frame 11 has a generally rectangular shape, which provides support for a substrate 12 when positioned in the frame 11. The frame 11 is a casing for the bipolar plate 10, as well as the bipolar battery 100. The outer surface of the frame 11 is the outer surface of the bipolar plate 10 and bipolar battery 100. The surface of the frame 11 is generally flat, and in particular, along the exterior surfaces of the frame 11. The frame 11 supports itself, as well as the bipolar plate 10 when assembled with the spacers 22 and terminals sections 30, especially when the bipolar plate 10 sits upright against a flat opposing surface.

The frame 11 further includes substrate receiving passageways 11a and material receiving passageways 11b, as shown in FIG. 2. The substrate receiving passageways 11a are grooves or channels, while the material receiving passageways 11b are openings in the frame 11 that receive the lead foils 14 and active materials 16, 18 on both stackable side of the bipolar plate 10.

The substrate receiving passageways 11a is a groove used to receive and secure the substrate 12, when the substrate 12 is positioned within the frame 11. Other configurations of substrate receiving passageways 11a are possible, including notches, indentations, recesses or any securing mechanism that secures the substrate 12 within the frame 11. For instance, the substrate 12 could be secured to the frame 11 using a weld or by adhesive, or by a fastener. However, in the embodiment shown, the substrate 12 is secured in the substrate receiving passageways 11a during manufacturing the bipolar plate 10.

Each material receiving passageway 11b is positioned in a substantial center of the frame 11 split from each other by the substrate 12, when the substrate 12 is positioned within the substrate receiving passageways 11a. Furthermore, the lead foils 14 and active materials 16, 18 are encased within an outer surface plane of the frame 11. These pair of cavities are dimensioned to securely receive the lead foils 14 and active materials 16, 18 within the frame 11.

In the embodiment shown, the substrate 12 is a separate piece of insulative material with respect to the frame 11, with the substrate 12 is received and secured within the substrate receiving passageways 11a of the frame 11. However, the frame 11 and substrate 12 can be formed together, as a monolithic structure, generally from the same material. During manufacturing, the frame 11 and the substrate 12 are constructed as one piece from the same material. This can be performed through a process such as injection molding, or other known methods.

The substrate 12 in the embodiment shown is an insulative plastic that is generally non-conductive, namely, polypropylene, acrylonitrile butadiene styrene (ABS), polycarbonate, copolymers, or polymer blends in the embodiment shown. As briefly discussed above, the substrate 12 may be prepared from the same material as the frame 11, regardless if the frame 11 and substrate 12 are prepare from a one piece construction.

Figures 7, 8, 9:
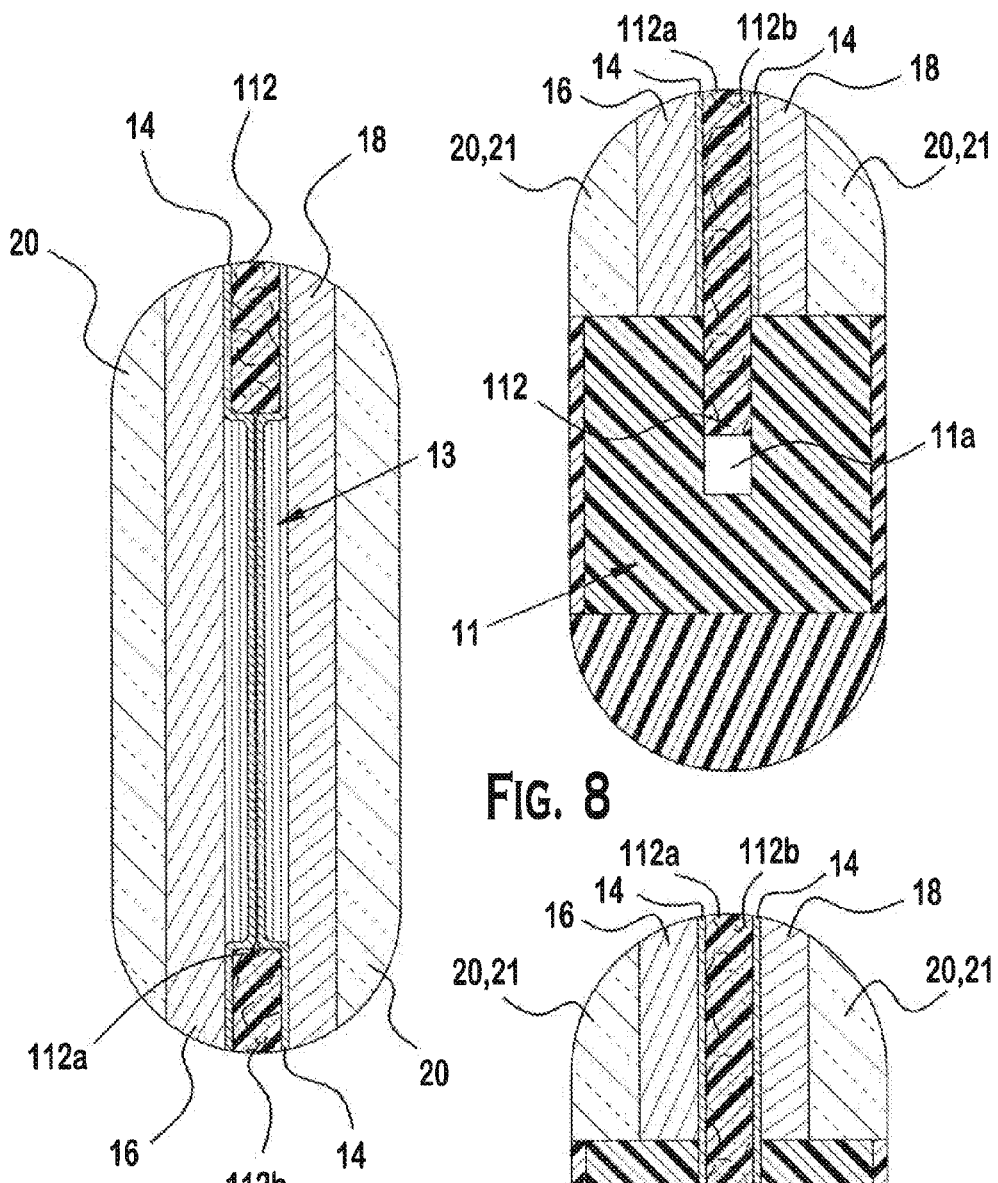
FIG. 7 is a close up view of the bipolar plate according to the invention showing a perforation in a substrate of the bipolar plate.
FIG. 8 is another close up view of the bipolar plate according to the invention, showing a non-conductive frame of the bipolar plate.
FIG. 9 is another close up view of the bipolar plate according to the invention, showing another non-conductive frame of the bipolar plate.

In an alternative embodiment, as shown in FIG. 7, the substrate 112 is generally nonconductive, being prepared from insulative plastic. However, conductive fibers and material are homogeneously dispersed throughout the insulative plastic. For instance, the substrate 112 may be prepared from a non-corrosive plastic sold by Integral Technologies, Inc, under the trade name Electriplast, which includes highly electrically conductive areas. The substrate 112, as shown in FIG. 7, includes a non-conductive resin-based material or thermoplastic 112a with a micron powder(s) of conductor particles and/or in combination of micron fiber(s) 112b substantially homogenized within the resin or thermoplastic 112a. As clearly shown in FIG. 7, the conductor particles or fibers 112b are homogenized throughout the body of the resin or thermoplastic 112a. In this example, the diameter D of the conductor particles of the conductor particles or fibers 112b in the powder is between about 3 and 12 microns. The conductor fibers of the conductor particles or fibers 112b have a diameter of between about 3 and 12 microns, typically in the range of 10 microns or between about 8 and 12 microns, and a length of between about 2 and 14 millimeters. The micron conductive fibers of the conductor particles or fibers 112b may be metal fiber or metal plated fiber. Further, the metal plated fiber may be formed by plating metal onto a metal fiber or by plating metal onto a non-metal fiber. Exemplary metal fibers include, but are not limited to, stainless steel fiber, copper fiber, nickel fiber, silver fiber, aluminum fiber, or the like, or combinations thereof. Exemplary metal plating materials include, but are not limited to, copper, nickel, cobalt, silver, gold, palladium, platinum, ruthenium, and rhodium, and alloys of thereof. Any platable fiber may be used as the core for a nonmetal fiber. Exemplary non-metal fibers include, but are not limited to, carbon, graphite, polyester, basalt, man-made and naturally-occurring materials, and the like. In addition, superconductor metals, such as titanium, nickel, niobium, and zirconium, and alloys of titanium, nickel, niobium, and zirconium may also be used as micron conductive fibers and/or as metal plating onto fibers.

The conductor particles and/or fibers 112b are substantially homogenized within the resin or thermoplastic 112a. The substrate 112 includes controlled areas of conductive surfaces on the substrate 112, wherein the conductive materials from the conductive particles or fibers 112b are exposed through the resin or thermoplastic 112a, which are conductively connected by the homogenization process. The conductive surfaces of the substrate 112 are controlled by further manufacturing techniques, such as etching or abrasive blasting, wherein the surface is roughened by chemical or by propelling a stream of abrasive material against the surface under high pressure. The conductor particles and/or fibers 112b are then exposed, and conductive areas of the substrate 112 are provided. The process provides a substrate 112 having a controlled amount of conductivity, including the size and area of conductivity.

It is also possible that the substrate 112 includes a combination of both conductive particles, powders, and/or fibers 112b, that are substantially homogenized together within an insulative resin or thermoplastic 112a during a molding process. The homogenized material is molded into a polygonal shape, as a substrate 112, which accommodates various custom designs or properties required for the bipolar plate 10 according to the invention. The substrate 112 may then be molded with the frame 11 in a single manufacturing technique. This allows the bipolar plate 10 and bipolar battery 100 to be simplified, wherein minimal parts are used and production steps are eliminated. Furthermore, the properties of the substrate 112 and battery 100 may be focused by providing and controlling conductive areas along the surface of the substrate 112. Since the frame 11 is insulative and the substrate 12, 112 is positioned in the substrate receiving passageways 11a, the bipolar plate 10 can act as a frame of the bipolar battery 100 when assembled.

During manufacturing, the substrate 12 is either insert molded into the substrate receiving passageways 11a, or the frame 11 is over molded over the substrate 12. However, if the frame 11 and the substrate 12 are moldable together, i.e. insert or over molding two pieces together or injection molding one monolithic piece, the manufacturing steps of the bipolar plate 10 can be simplified, with less parts. Furthermore, this process allows the ability to customize the size and shapes of the bipolar plate 10 and bipolar battery 100 according to the invention.

Now with reference back to FIGS. 1 and 2, the substrate 12 and the substrate 112 shown in FIGS. 4-8 includes perforations 13 along the surface of the substrate 12, 112, and through the body extending through an opposite surface. In the embodiment shown, the perforations 13 are circular, but could otherwise be any shape. The perforations 13 are positioned in a symmetrical grid pattern. The perforations 13 are positioned in four quadrants of the shown substrate 12, 112. Having a number of perforations 13 positioned in a symmetrical grid arrangement provides even conductions through the substrate 12, 112 when lead foils 14 are positioned on the opposite sides of the substrate 12, 112.

Additionally, the substrate 112 includes conductive particles, powders, and/or fibers 112b along the surface and through the body of the substrate 112, as clearly shown in FIG. 5-9. In general, there are surface areas of the substrate 112 are insulative, while other areas are conductive resulting from the conductive particles, powders, and/or fibers 112b. As discussed above, the amount of conductive area can be controlled through manufacturing of the substrate 112. For instance, the surfaces of the substrate can be roughened to expose conductive areas that may be custom in size and shape with respect to a whole exposed surface side of the substrate 12, or the amount of conductive particles, powders, and/or fibers 112b can be controlled with respect to the amount of insulative resin or thermoplastic 112a. In the embodiment shown in FIGS. 5-9, the whole exterior surface of the substrate 112 has been roughened to expose conductive particles, powders, and/or fibers 12b. Hence, the substrate is conductive on the exposed surface sides of the substrate and the lead foils 14 are positioned on the conductor particles, powders, and/or fibers 112b.

Now with reference to FIGS. 1, 2, 7, and 8, the lead foils 14 will be discussed, which are positioned within the material receiving passageway 11b, on opposite sides of the substrate 12, 112. The lead foils 14 are conductive and connect with each other through the perforations 13. More specific, the lead foils 14 are mechanically and electrically connected to each other in the embodiment shown. The substrate 12, 112 generally is insulative, or only includes a limited area or conductivity based on conductor particles and/or fibers 112b in the insulative resin or thermoplastic 112a. As a result, perforations 13 are used to connect the lead foils 14 with each other in the bipolar plate 10, notably for a bipolar plate 10 having substrate 12 prepared exclusively from insulative material. The lead foils 14 are welded together, as shown in FIG. 2, by resistance welding or other process known to the art. On the other hand, a bipolar plate 10 having a substrate 112, as shown in FIG. 7, which includes the conductor particles or fibers 112b homogenized in the resin or thermoplastic 112a, may also include perforations 113, which allow for further control and efficiency in conductivity between the lead foils 14 and active materials 16, 18 in the bipolar plate 10 according to the invention.

In either case, the perforations 13 can vary in size, shape, or grid pattern, but are large enough that the lead foil 14 can be positioned in and through the perforations 13 and connected to an adjacent lead foil 14. The perforations 13 can be molded or milled into the substrate 12 during manufacturing. With reference to FIGS. 1, 2, and 8, the lead foils 14 are shown, being positioned on the both exposed surfaces of the substrate 12, 112 respectively, and dimensions to fit within the material receiving passageways 11b of the frame 11. The lead foil 14 is dimensioned to securely fit in the material receiving passageway 11b, such that the frame 11 encases each lead foil 14 positioned on both sides of the substrate 12, 112. The leads foils 14 are mechanically and electrically connected through the perforations 13, as shown in FIG. 7.

As shown in FIG. 9, the lead foils 14 may be inserted into the substrate receiving passageways 11, along with the substrate 12, 112 during manufacturing and assembly. The lead foils 14 may encased within the frame during insert molding, over molding, or similar manufacturing technique where the lead foils 14 and substrate 12, 112 are manufactured within the substrate receiving passageways 11a. The lead foils 14 are positioned on opposite surfaces of the substrate 12, 112 and then either inserted or manufactured within the frame 11. It is possible to apply the lead foils 14 by known plating, vapor deposition, or cold flame spray methods.

It is also possible that the lead foil 14 is a paste having lead, which is positioned along the front and rear surfaces of the substrate 12, 112. The paste is spread across opposite surfaces (i.e. front and rear surfaces) of the substrate 12, 112 and within the perforations 13. The paste connects both sides of the substrate 12, 112 through the perforations 13. The paste would be thick enough to provide connectivity between the pastes on each side, but should not be thicker than the material receiving passageway 11b, considering an active material 16, 18 is also positioned within the material receiving passageway 11b.

With reference to FIGS. 2 and 5-9, the active materials 16, 18 are shown and positioned on exposed sides of the lead foils 14, facing away from the substrate 12, 112. The first layer of active material 16 is a positive active material paste (PAM) that is applied over one lead foil 14, while a negative active material (NAM) is applied over the other lead foil 14, which is the second active material 18. In the embodiment shown, the positive active material paste (PAM) and the negative active material (NAM) are paste of lead or lead oxide mixed with sulfuric acid, water, fiber, and carbon.

The thickness of the active materials 16, 18 (i.e. NAM and PAM) should not extend outside the material receiving passageway 11b of the frame 11. Rather, the overall thickness $T_m$ of the substrate 12, 112, lead foils 14, and active materials 16, 18 is less than the thickness $T_f$ of the frame 11.

The frame 11 encases the substrate 12, 112, lead foils 14, and active materials 16, 18. As a result, when assembled the bipolar battery 100 is assembled in stacks of bipolar plates 10, the frame 11 acts as a support and exterior surface for the bipolar battery 100. The number of assembly steps and parts can be minimized. Furthermore, the bipolar battery 100 and bipolar plate 10 can be easily customized for various applications, since the frame 11 and substrate 12 can be molded to various shapes and sizes.

Figure 4:
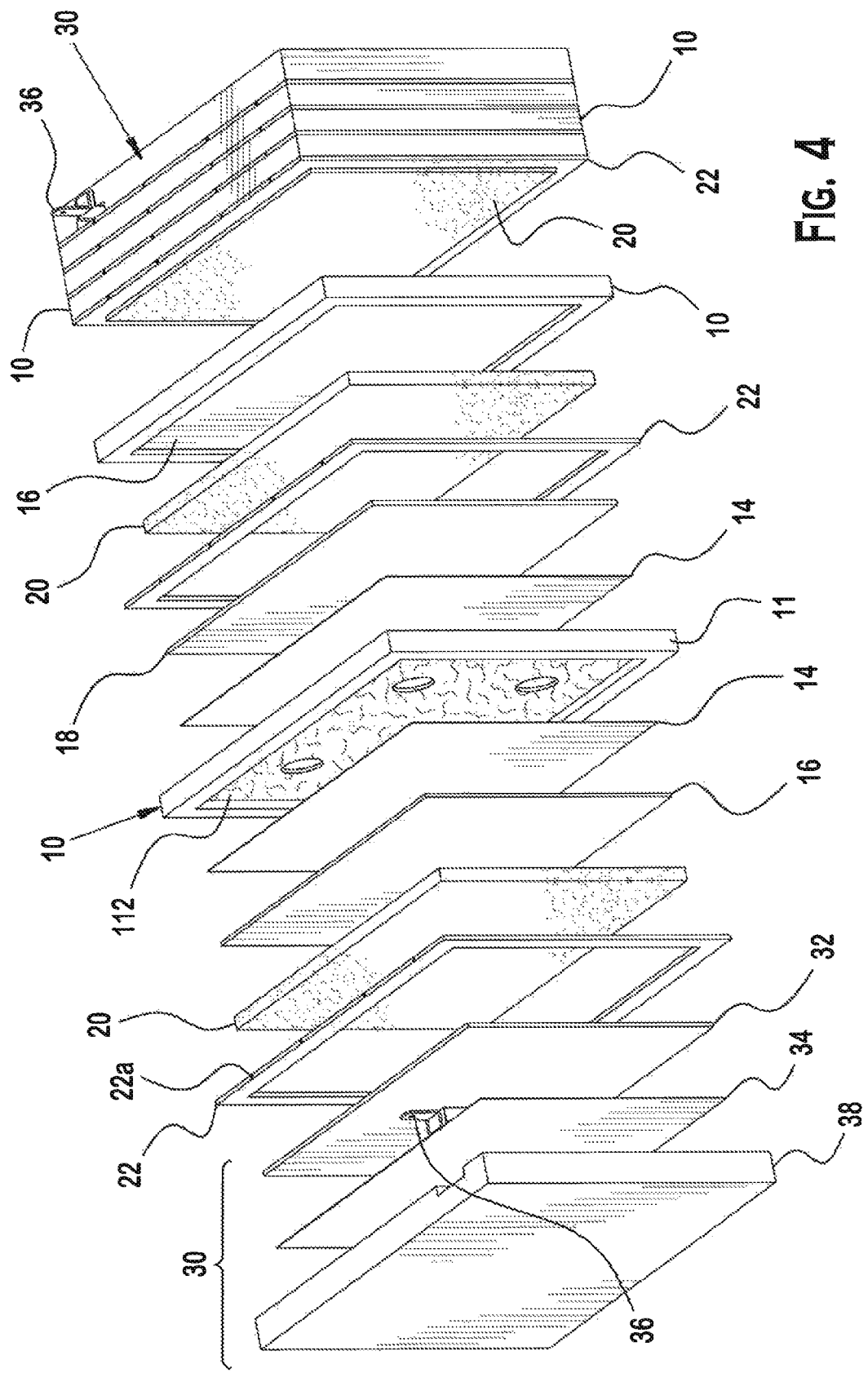
FIG. 4 is an exploded perspective view of the bipolar battery of FIG. 4.

Now with reference to FIGS. 3 and 4, spacers 22 are shown that stack and seal with the bipolar plates 10 according to the invention, and used to hold an electrolyte 20 for the bipolar battery 100.

The spacer 22 is shown between stacking adjacent bipolar plates 10. The spacer 22 is essentially a casing having similar dimensions as the frame 11 and includes an electrolyte receiving space 22a, as shown in FIGS. 3-6. The electrolyte receiving space 22a is a hole through the electrolyte receiving space 22a, positioned substantially in the center of the spacer 22 and holds an electrolyte 20. When sealed between two adjacent bipolar plates 10, the spacer 22 prevents the electrolyte 20 from leaking and allows the electrolyte 20 to provide conductivity between the bipolar plates 10.

As shown in FIGS. 5 and 6, at least one electrolyte receiving channel 22b is provided in the spacer 22, which is positioned on an outer surface of the spacer 22 and directed into the electrolyte receiving space 22a. A user can provide electrolyte 20 through the electrolyte receiving channel 22b and into the electrolyte receiving space 22a, after the spacer 22 is assembled and sealed with adjacent bipolar plates 10. In general, the electrolyte receiving channel 22h is an opening in the spacer 22 that extends through the spacer 22 and into the electrolyte receiving space 22a. However, other mechanisms or structures known to the art could be used to allow ingress of electrolyte 20 into the electrolyte receiving space 22a. The receiving channel 22b can be plugged or obstructed in some capacity when not utilized, or used to vent gases from the electrolyte receiving space 22a.

The electrolyte 20 may be a variety of substances, including acid. However, the substance should be a substance that includes free ions that make that substance electrically conductive. The electrolyte 20 may be a solution, a molten material, and/or a solid, which helps create a battery circuit through the electrolyte's ions. In the bipolar battery 100 according to the invention, the active materials 16, 118 provide a reaction that converts chemical energy to electrical energy, and the electrolyte 20 allows the electrical energy to flow from the bipolar plate 10 to another bipolar plate 10, as well as to electrodes 36 of the battery 100.

In the embodiment shown, the electrolyte 20 is an acid that is held in an absorbed glass mat (AGM) 21, as shown in FIGS. 4 and 5. The electrolyte 20 is held on the glass mat 21 by way of capillary action. Very thin glass fibers are woven into the glass mat 21 to increase surface area enough to hold sufficient electrolyte 20 on the cells for their lifetime. The fibers that include the fine glass fibers glass mat 21 do not absorb nor are affected by the acidic electrolyte 20 they reside in. The dimension of the glass mat can be varied in size. However, in the embodiment shown, the glass mat 21 fits within the electrolyte receiving space 22a, but has a greater thickness than that the spacer 22. Additionally, the electrolyte receiving space 22a, in the embodiment shown, includes additionally space for a portion of the electrolyte 20, and more specifically the glass mat 21. As a result, the design of the bipolar battery 100, according to the invention, allows for the spacer 22 holding the glass mat 21 to uniformly stack with adjacent bipolar plates 10, wherein the active materials 16, 18 sit on the glass mat 21 containing the electrolyte 20.

It is also possible that the glass mat 21 is removed, and an electrolyte 20, such as a gel electrolyte, is free to flow between adjacent active materials 16, 18 between adjacent stacked bipolar plates 10 on either side of the spacer 22.

It is also possible, in other embodiments, that the spacer 22 is an extension of the frame 11. In general, the frame 11 includes a deeper material receiving passageway 11b in order to encase the lead foils 14 and active materials 16, 18, as well as electrolyte 20. Furthermore, if the frame 11 may be dimensioned such that the material receiving passageways 11b of stackable bipolar plates 10 can also hold an fiber glass mat 21 between each other, enclosing an encasing the lead foils 14, active materials 16, 18, glass mat 21, and electrolyte 20 within the stacked and sealed bipolar plates 10. The frame 11 may include the electrolyte receiving channel 22b that extends through the frame and into the material receiving passageway 11b. In this embodiment, the bipolar plates 10 can be stacked onto each other and sealed.

Now with reference to FIGS. 4-6, the terminal sections 30 of the bipolar battery 100 will be discussed, which cap the ends of the bipolar battery 100. The terminal sections 30 stack on opposite sides of stacked bipolar plates 10, the number of bipolar plates 10 stacked next to each other depends on the electrical potential required of a specific battery design and shape.

Each terminal section 30 includes an additional layer of active material 32, a terminal plate 34, an electrode 36, and an end plate 38. The end plates 38 are positioned on opposite ends of the stacked bipolar plates 10, with the active material 32, the terminal plate 34 and electrode 36 positioned within the end plate 38.

The active material 32 is provided to increase electrical flow through the bipolar battery 100, from one terminal section 30 to the other terminal section 30. The active material 32 is made of material that interacts with an adjacent active material 16, 18 from an adjacent bipolar plate 10. Since a spacer 22 and electrolyte 20, as described above, is positioned on each stackable side of the bipolar plates 10, a spacer 22 is positioned between the terminal section 30 and an outside bipolar plate 10. As a result, ions can freely flow through the electrolyte 20 and onto the active material 32 of the terminal section 30.

As shown in FIGS. 5-6, the terminal plate 34 is provided and encased within the terminal section 30. The terminal plate 34 is conductive and generally a metal. The terminal plate 34 attaches to an electrode 36, which either an anode or a cathode of the bipolar battery 100. The anode is defined as the electrode 36 at which electrons leave the cell and oxidation occurs, and the cathode as the electrode 36 at which electrons enter the cell and reduction occurs. Each electrode 36 may become either the anode or the cathode depending on the direction of current through the cell. It is possible that both the terminal plate 34 and the electrode 36 are formed as one piece.

As shown in FIGS. 4-6, the end plate 38 is nonconductive and provides structural support to ends of the bipolar battery 100 according to the invention. The end plate 38 includes a terminal receiving passageway 38a, which is a recess in which the terminal plate 34, electrode 36, and active material 32 are positioned. Additionally, like the material receiving passageway 11b, the terminal receiving passageway 38a provides enough clearance for an amount of electrolyte 20 to be encased with the terminal section 30, and specifically within the material receiving passageway 11b along with the active material 32, terminal plate 34, and electrode 36. In the embodiment shown in FIGS. 5 and 6, the terminal receiving passageway 38a provides enough space to receive and enclose a portion of the glass mat 21, as well.

With reference to FIGS. 3 through 8, the assembly of the bipolar battery 100 according to the invention will be further discussed.

The bipolar plate 10 is manufactured and assembled with the substrate 12, 112 secured with the frame 11. The substrate 12, 112 includes perforations 13 and/or conductor particles or fibers 112b, and is generally molded with the frame 11, either as a single or separate component. Once the substrate 12, 112 is positioned within the frame 11, the lead foils 14 are positioned with the material receiving passageways 11b of the frame 11 on both exposed surfaces of the substrate 12, 112. The lead foils 14 are mechanically connected together through the perforations 13, and electrically connected through conductor particles or fibers 112b provided in the substrate 12, 112. A first active material 16 is then positioned in the material receiving passageways 11b on one side of the substrate 12, while the second active material 18 is positioned on another side of the substrate within material receiving passageways 11b. As a result, the frame 11 encases the substrate 12, lead foils 14, and active materials 16, 18 within surface boundaries of the bipolar plate 10.

The bipolar plates 10 are stacked then next to each other with spacers 22 provided between each stacked bipolar plate Electrolyte 20 is provided in the electrolyte receiving space 22a, which is dimensioned similar to the material receiving passageway 11b of the frame 11. A fiber glass matt 21 can be provided in the electrolyte receiving space 22a, as well, and an electrolyte 20 is provided into the fiber glass matt 21 through the electrolyte receiving channel 22h. The spacers 22 and bipolar plates 10 evenly stack one next to the other, and are subsequently sealed. Since the spacers 22 and stacked bipolar plates 10 include non-conductive outer surfaces, the spacers 22 and frames 11 of the bipolar plates 10 create an outer shell for the bipolar battery 100. The frames 11 of the bipolar plates 10 and spacers 22 can be secured to each other by any method known to the art such that the touching surfaces of the spacers 22 and the frame 11 are secured to each other and sealed. For instance, an adhesive can be used to connect and seal the surfaces together. Additionally, once the terminal sections 30 are assembled, they may be positioned on the stacked bipolar plates 10 and spacers 22, and then sealed in the same manner.

It is also possible, that the end plates 38, the spacer 22, and the frame 11 include securing mechanisms (not shown), such as joint technique or fastener, to connect the pieces of the bipolar battery 100 together. Then a sealant may be applied to provide a seal around the bipolar battery 100, and more specifically, a seal around the connecting end plates 38, spacers 22, and frame 11.

It is also possible, that the bipolar plates 10 are stacked and secured next to each other without a spacer 22. However, the material receiving passageway 11b should be large enough to hold and encase the lead foils 14, active materials 16, 18 and an electrolyte 20, including a fiber glass mat 21, when the stacked bipolar plates 10 are sealed together. Furthermore, the frame 11 should include at least one electrolyte receiving channel 22b positioned in an extension of the frame 11, so that electrolyte 20 can be provided into the material receiving passageway 11b of the frame 11, or allow venting of the electrolyte 20.

The number of bipolar plates 10 used in the bipolar battery 100 is a matter of design choice, dependent upon the size of battery 100 and the electrical potential required. In the embodiment shown, there are at least three bipolar plates 10 stacked next to each other. On opposites ends of the stacked bipolar plates 10 and electrolyte 20 are terminal sections 30, which include a layer of active material 32, a terminal plate 34 and electrode 36, as well as an end plate 38. In the embodiment shown, the outer surfaces of the spacer 22 and the frame 11 are substantially flush with each other when stacked and sealed. This design provides a smooth outer support surface. However, it is possible that irregularities in the surface may exist. For instance, the spacer 22 may be larger than the frame 11; however, the electrolyte receiving space 22a cannot be larger than the frame 11. Additionally, the material receiving passageway 11b cannot be larger than the spacer 22. In either case, it may be difficult to seal the spacer 22 and bipolar plates 10, and the electrolyte 20 could leak from the bipolar battery 100 after assembly and the electrolyte 20 is positioned between adjacent bipolar plates 10.

Furthermore, when the end plate 38 is stacked next to an adjacent spacer 22 and/or frame 11 of an adjacent bipolar plate 10, the outer surfaces of end plate 38, the spacer 22 and the frame 11 should be substantially flush. However, it is possible that irregularities in the surface may exist. For instance, the end plate 38 may be a bit larger than the spacer 22, which may be larger than the frame 11. Nonetheless, terminal receiving passageway 38a should not be larger than the receiving channel 22b or the frame 11. Additionally, the terminal receiving passageway 38a should not be larger than the material receiving passageway 11b or the frame, or the end plate 38 should not be smaller than then the spacer 22. In either case, the electrolyte 20 may leak from the bipolar battery 100 after assembly and the electrolyte 20 is provided between stacked bipolar plates 10. In general, the frame 11 supports the bipolar plate 10, encasing the substrate 12, lead foils 14, and active materials 16, 18, as well as electrolyte. When stacked, the bipolar plates 10, with adjacent spacers 20 and stacked terminal sections 30 provide an outer support surface for the bipolar battery 100. This construction provides a bipolar battery 100 having a simplified designed, having fewer manufacturing steps and fewer parts than required in the prior art. Since the frame 10, spacer 22, and end plate 38 are insulative plastic and moldable, the bipolar battery 100 can be customized to accommodate shape and size requirements dependent on electrical potential and use.

In another embodiment, as shown in FIG. 5, a protective casing 200 is further provided, than encloses the bipolar battery 100 according to the invention. The casing 200 would include body 202, a cover 204, and an electrode receiving space 206, in order for the electrode 36 to extend out of the casing 200. Unlike an external structure of the bipolar battery 100, the casing 20 can be used to house the bipolar battery 100 and provide greater protection.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A bipolar battery plate for a bipolar battery, comprising:
a frame;
a substrate positioned within the frame and having a plurality of perforations, the substrate formed of a non-conductive insulative plastic having conductive particles that are homogeneously dispersed throughout the insulative plastic;
a first lead layer positioned on one side of the substrate;
a second lead layer positioned on another side of the substrate, the first and second lead layers electrically connected to each other through the plurality of perforations;
a positive active material (PAM) positioned on a surface of the first lead layer; and
a negative active material (NAM) positioned on a surface of the second lead layer.

2. The bipolar battery plate according to claim 1, wherein the frame is a moldable insulative polymer.

3. The bipolar battery plate according to claim 1, wherein the frame is an outer wall of the bipolar battery that provides structural support for the bipolar battery.

4. The bipolar battery plate according to claim 1, wherein the frame includes substrate receiving passageways.

5. The bipolar battery plate according to claim 4, wherein the frame includes material receiving passageways.

6. The bipolar battery plate according to claim 5, wherein the substrate receiving passageways secure the substrate within the frame.

7. The bipolar battery plate according to claim 6, wherein the material receiving passageways are areas between outer surfaces of the frame and a surface of the substrate.

8. The bipolar battery plate according to claim 7, wherein the substrate is a separate piece of insulative material than the frame, and the substrate is received and secured within substrate receiving passageway of the frame.

9. The bipolar battery plate according to claim 5, wherein the material receiving passageways are an area between outer surfaces of the frame and a surface of the substrate.

10. The bipolar battery plate according to claim 9, wherein the material receiving passageways receive the first and second lead layer, the positive active material, and the negative active material within the frame.

11. The bipolar battery plate according to claim 1, wherein the substrate is prepared from the same material as the frame in a one piece construction.

12. The bipolar battery plate according to claim 1, wherein the substrate includes conductive surfaces where the surfaces of the substrate are roughened by a chemical or abrasion and the conductor particles are exposed outside the insulative plastic.

13. The bipolar battery plate according to claim 1, wherein the perforations are positioned along and extending through the substrate.

14. The bipolar battery plate according to claim 13, wherein the lead layers are lead foils that are conductive through the perforations.

15. The bipolar battery plate according to claim 14, wherein the lead foils are mechanically and electrically connected to each other through the perforations.

16. The bipolar battery plate according to claim 15, wherein the lead foils are connected through the perforations by a weld.

17. The bipolar battery plate according to claim 15, wherein the perforations are large enough that the first lead layer can be positioned in and through the perforations and connected to the second lead layer.

18. The bipolar battery plate according to claim 1, wherein first and second lead layers are a lead paste that is positioned along front and rear surfaces of the substrate.

19. The bipolar battery plate according to claim 18, wherein first lead layer is spread across the front surface of the substrate and within at least one of the perforations so that that first lead layer connects to the second lead layer on an opposite side.

20. The bipolar battery plate according to claim 1, wherein the positive and negative active materials are positioned over the first and second lead layers respectively within a material receiving passageway of the frame.

21. The bipolar battery plate according to claim 20, wherein first active material is a paste applied over the first lead layer and the second active material is a paste spread over the second lead layer.

* * * * *